United States Patent [19]

Burkwall, Jr. et al.

[11] 4,191,783

[45] Mar. 4, 1980

[54] SHELF STABLE, HIGH MOISTURE FOOD AND PROCESS

[75] Inventors: Morris P. Burkwall, Jr., Barrington; Penelope L. Gould, Crystal Lake, both of Ill.

[73] Assignee: The Quaker Oats Company, Chicago, Ill.

[21] Appl. No.: 848,503

[22] Filed: Nov. 4, 1977

[51] Int. Cl.² .............................................. A23J 1/02
[52] U.S. Cl. ...................................... 426/335; 426/72; 426/331; 426/532; 426/646; 426/657; 426/805
[58] Field of Search ............... 426/657, 335, 532, 805, 426/74, 615, 623, 630, 516, 72, 331, 646

[56] References Cited

U.S. PATENT DOCUMENTS

| | | | |
|---|---|---|---|
| 3,974,296 | 8/1976 | Burkwall | 426/646 X |
| 4,011,345 | 3/1977 | Bartsch | 426/72 X |
| 4,039,692 | 8/1977 | Clausen | 426/805 X |
| 4,054,674 | 10/1977 | Barker et al. | 426/805 X |
| 4,055,676 | 10/1977 | Foulkes | 426/805 X |

FOREIGN PATENT DOCUMENTS 752427  4/1975  South Africa ................ 426/805

*Primary Examiner*—R. B. Penland
*Attorney, Agent, or Firm*—Charles J. Hunter; Mathew R. P. Perrone, Jr.

[57] ABSTRACT

A high moisture content food of water activity 0.91 to 0.95 is rendered shelf stable by the addition thereto of a stabilizing composition comprising sufficient acid to reduce the pH to a range of 4.0 to 6.8 and a sufficient amount of propylene glycol, 1,3-butanediol or mixtures thereof.

20 Claims, 1 Drawing Figure

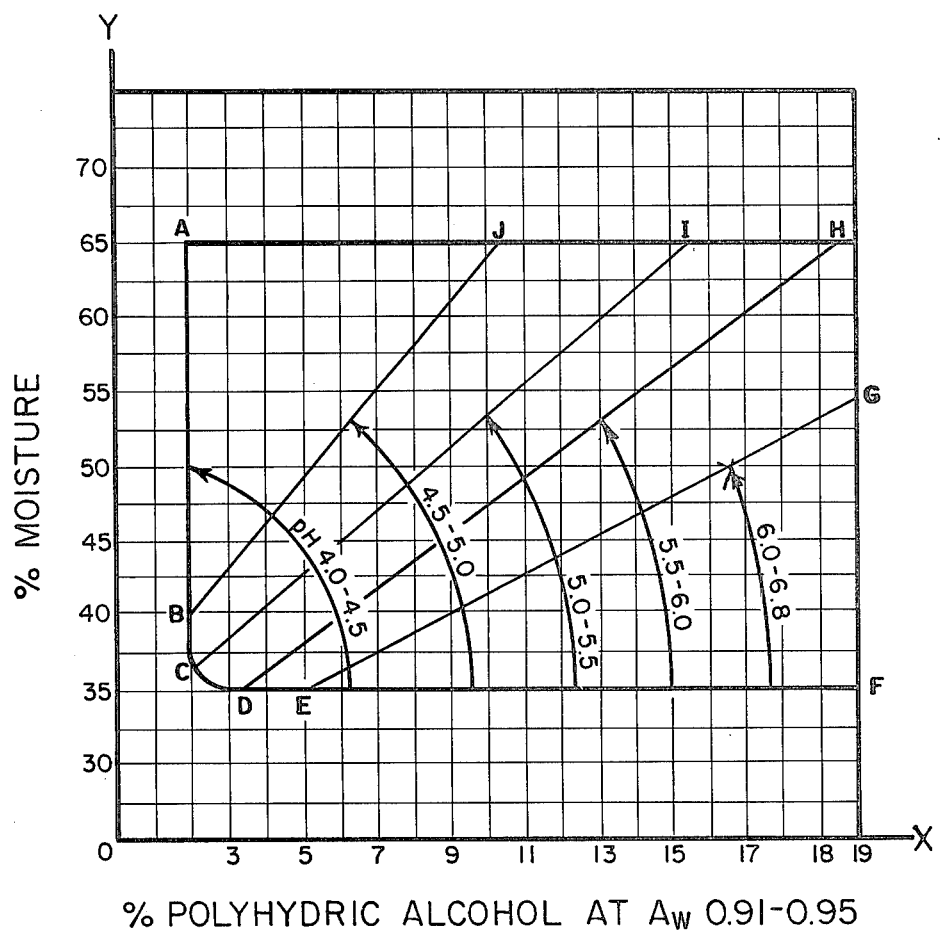

SHELF STABLE, HIGH MOISTURE FOOD AND PROCESS

BACKGROUND OF THE INVENTION

This invention relates to a food, and more particularly to a food having shelf stability while retaining a high moisture content.

Food storage and stability of the stored product are well known problems in the food art. Generally speaking, a high moisture content food is the most palatable, but the least stable. On the other hand, a low moisture content food is the most stable but the least palatable. This distinction applies to foods in general. A discussion directed to pet food, but applicable to all food amplifies to these problems.

Within the class of foods known as pet foods there are three basic subdivisions—dry pet food, semi-moist pet food, and moist pet food. The moisture is determined by considering both the water present in the ingredients of the product and the additional water combined with the various ingredients that make up the final product. In general, the dry pet food—due to its low moisture content which is usually less than about 15 percent—tends to exhibit the greatest microbiological stability and requires no special handling or packaging upon distribution.

At the opposite end of the spectrum is the moist pet food having a moisture content in excess of about 70 percent. Due to the high moisture content of the moist pet food, microbiological stability is a major problem. The problem in a moist pet food is overcome only by heat sterilizing the moist pet food and packaging the moist pet food in a hermetically sealed package. Refrigeration is required after the package of moist pet food is opened to preserve the leftover pet food for even a short time.

Semi-moist pet food has a moisture content generally ranging from about 15 percent to about 50 percent. Since semi-moist pet foods are higher in moisture content than dry and lower in moisture than canned, special techniques are required to render it microbiologically stable. This moisture content in combination with special techniques may produce a microbiologically stable food which does not require refrigeration. At the same time, the higher moisture content of the semi-moist pet food provides an increase in palatability when compared to the dry pet food. The semi-moist pet food is generally rendered microbiologically stable by using appropriate combinations of appropriate solutes. In this fashion, shelf stability without heat sterilization, hermetically sealing or refrigeration is achieved while providing a food having increased palatability relative to dry pet food.

Microbiological stability is a term encompassing a number of features with regard to the storage capabilities of food. This generic term includes three specific stability problems which are common to foods. Firstly, stability against bacteria growth is classified under microbiological stability. Secondly, stability against mold growth is classified under microbiological stability. Thirdly, stability against yeast growth is also classified under microbiological stability. These problems are the problems which must be overcome to achieve semi-moist shelf stability.

When considering palatability, the moist pet foods are the most palatable and the dry pet foods are least palatable. The semi-moist pet foods fall somewhere in between the moist and dry pet foods with respect to their palatability. Thus semi-moist pet food has both advantages and disadvantages.

Another advantage of increasing the moisture content is the improvement in the texture. The increase in moisture results in a softer, more realistic, meat-like (and therefore more desirable) texture for the food. Yet achieving this moisture as above discussed in some cases destroys the desired shelf stability. Thus, it is necessary to balance shelf stability against desired texture and achieve appropriate conditions. In other words, it is necessary to sacrifice this desired texture in order to achieve the desired stability.

As shown by the prior art, especially critical for achieving microbiological stability of a semi-moist food are water activities below about 0.90, because when the water activity exceeds 0.90, as taught by the prior art, a semi-moist product may not be stable. Accordingly, the semi-moist food range has generally been restricted to moisture content below 50 percent and water activity below 0.90.

The microbiological stabilization of a semi-moist food by water activity is usually achieved by the addition of osmotic pressure lowering agents, which in turn maintain the water activity below 0.90 preferably below 0.85. Typically osmotic pressure lowering agents are compounds such as sugar, glycerol, or salts. It is generally recognized that below a level of 0.90 growth of bacteria will be inhibited, whereas yeast and mold are not inhibited until much lower levels are reached. This feature is clearly discussed in N. Potter, "Intermediate Moisture Foods; Principles & Technology" *Food Product Development* Volume 4, No. 7, November 1970. So a problem exists at water activities in the range of 0.91–0.95, due to possible growth of many different microorganisms.

The water activity ($A_w$) of food and particularly semi-moist food can be measured by several different methods, such as manometric technique, electric hygrometer and the microcrystalline cellulose method. Of the three methods, the microcrystalline cellulose method has been found comparable to the hygrometer method and superior to the manometer method at water activities in the range covered by this application. It is more useful or economical than the hygrometer or manometric device in that it does not involve the expense of special instrumentation. This method is employed to measure the water activity examples given in this application and is based on the equilibrium moisture absorption of microcrystalline cellulose at a given temperature. This microcrystalline-cellulose method is well-discussed in the art as evidenced by P. T. Vos & T. P. Labuza, "Technique for Measurement of Water Activity in the High $A_w$ Range", *Journal of Agricultural and Food Chemistry* Vol. 22, No. 2, March/April 1974, pp 326, 327.

In view of the fact that palatability generally increases with moisture, it is extremely desirable to increase the moisture content of a food. It is even more desirable to achieve this increase in moisture and palatability while retaining the shelf stability against microbiological degradation of a semi-moist food. Accordingly, much research is devoted to this area. There are several known means of achieving some stability at high moisture levels and high water activity. To some extent, it has been possible to increase the moisture content above 50 percent while maintaining the water activity at 0.90 or below by using linear aliphatic 1,3-diols having 4–15 carbon atoms in the chain and derivatives thereof. It is also possible to achieve stability at a high moisture range of about 35 to 60 percent using combinations of glycerol plus either propylene glycol or 1,3-butanediol in a neutral pH range and with potassium sorbate, an antimycotic.

Furthermore, there are two other major disadvantages to the prior art pet food which use a high percentage of propylene glycol and 1, 3-butanediol. Firstly, both of these compounds are petroleum based. Petroleum based additives can be in short supply as evidenced by the most recent fuel crisis and shortage of these petroleum bases. Furthermore, several reports indicate that in the future a severe shortage of petroleum based products will result from a shortage of petroleum itself. Accordingly, it is desirable to minimize the use of petroleum based products. Also, these components in sufficient quantities provide a bitter taste to the food. This bitter taste and the petroleum based characteristics indicate the desirabilities of minimizing the use of these products.

Like diols and glycols, acid used for stabilization has sometimes unexpected and undesirable results. The acid may produce a tart or sour taste in the food thereby interfering with the organoleptic properties of the food. Sometimes, the acid is also capable of emitting an unsuitable odor which even further affects the organoleptic capabilities of the food. Thus, if the use of acid can be minimized, while retaining the stability of the food, desired results are obtained.

However, these methods and similar methods are limited in that there is no satisfactory way to predict the stability of food at these high moisture levels when the water activity exceeds 0.91. The method used now is basically a trial and error method requiring formulation of a food and then testing the food for stability. In addition no scientific way is known for predicting the microbiological stability of foods having such high moisture contents (above about 35 percent).

It is more desirable to replace these methods and similar methods with a more scientific method of predicting stability in products with water activities above 0.91. It can be of great benefit to the food technology art if there is a method provided for predicting the stability effect of various ingredients to form a desired stable food even at the higher moisture levels. This food need not necessarily be clearly definable as either semi-moist or moist. The critical feature of this food is that it have the desired moisture level to provide a desired level of palatability and texture while at the same time retaining the desired characteristics of a shelf stable, semi-moist food. These opposing factors of increased moisture and microbiological stability mitigate against classification of the food in either the semi-moist or the moist category. Even though such features are contradictory, it is nevertheless clearly desirable to achieve both goals.

It is generally known in the art that a semi-moist food usually must incorporate an antimycotic agent to prevent the development of mold growth. However, an antimycotic has many disadvantages. This costly additive can impart a bitter metallic aftertaste to the food, thereby having an adverse effect on palatability. It is therefore necessary to mask the flavor of this ingredient or use a sufficiently low dosage to avoid the problems thus created while maintaining the desired mold free characteristics. It may also be desirable to eliminate this component from the food to avoiding masking and other problems while retaining the mold-free characteristics.

Some attempts are known which eliminate the use of an antimycotic agent. One attempt uses high concentrations of (preferably 20 to 25 percent) aliphatic 1,3-diols having from 4 to 15 carbon atoms. This attempt suffers from two problems. The use of these four carbon atom diols in foods as yet does not have the approval of the Food and Drug Administration. Also, it is not effective in all cases because sometimes antimycotic is still required in certain formulations.

Another method utilizes high levels of propylene glycol in combination with starch modifying material at moisture contents of 20 to 35 percent to produce a product that does not require potassium sorbate. The use of glycerol mono stearate as the starch modifier is required to retain the moisture readily and preserve the texture of the product during storage. The energy required for the high processing temperatures of the method adds greatly to the cost of the food and is therefore undesirable. Also, the problem with adding high levels of farinaceous materials is that it contributes to the staling of the product even in the presence of the starch modifier. A stale product is undesirable and loses the desired soft moist texture. Storage permits the product to stale due to the starch and produces the undesired texture. Thus, a substantial number of problems exist when attempting to reduce the amount of or to remove an antimycotic from a semi-moist pet food and in trying to increase the moisture content of a semi-moist food. It is clearly desirable to solve these problems.

It is highly desirable to be able to predict food stability especially at higher moisture contents. If such a method of predicting stability can be developed, and combined with the production of higher moisture content foods, a food having improved palatability and improved texture due to increased moisture content and shelf stability similar to that provided in a semi-moist food may be achieved.

Thus, it may be seen that there are still many obstacles to achieving both high moisture and shelf stability in a food.

SUMMARY OF THE INVENTION

Therefore, an object of this invention is to provide a high moisture, shelf stable food.

A further object of this invention is to provide a high moisture, shelf stable food on a predictable basis.

A still further object is to provide a food having improved softness.

Yet a further object is to provide a food with improved palatability.

Also an object of this invention is to provide a food having stability against mold.

Another object of this invention is to provide a high moisture, shelf stable pet food.

Still another object of this invention is to provide a high moisture, shelf stable pet food on a predictable basis.

Yet another object of this invention is to provide a high moisture, shelf stable pet food having improved softness.

Also an object is to provide a pet food having improved palatability.

Also an object of this invention is to provide a pet food having stability against mold.

A further object of this invention is to provide a process for making a predictably shelf stable, high moisture food.

A still further object of this invention is to provide a process for making a high moisture, shelf stable food on a predictable basis.

Yet a further object is to provide a process for making a food having improved softness.

Another object of this invention is to provide a process for making a food having improved palatability.

Still another object of this invention is to provide a process for making a food having mold stability.

Yet another object of this invention is to provide a process for making a shelf stable, high moisture pet food.

Still another object of this invention is to provide a process for making a high moisture, shelf stable pet food on a predictable basis.

Also an object is to provide a process for making a pet food having improved softness.

A further object of this invention is to provide a process for making a pet food having improved palatability.

A still further object of this invention is to provide a process for making a pet food having stability against mold.

These and other objects of this invention are met by stabilizing, from a microbiological standpoint, a food having a water activity of about 0.91 to about 0.95 where the pH of the food is about 4.0 to about 6.8 and the food further comprises propylene glycol, 1,3-butanediol, or mixtures thereof at a content of about 2 to about 19 percent by weight of the food and optionally in combination with an antimycotic agent.

BRIEF DESCRIPTION OF THE DRAWING

The sole FIGURE of the drawing depicts a graph of a stable food containing sufficient amount of antimycotic to prevent mold and shows the pH required for stability when the moisture content is within a certain range as plotted on the Y axis of the graph and the percent of the propylene glycol and 1,3-butanediol is within an appropriate range as plotted on the X axis of the graph.

DESCRIPTION OF THE PREFERRED EMBODIMENTS

A food having high moisture and high water activity in the range of 0.91 to 0.95 is predictably stabilized by a stabilizing mixture comprising 1,3-butanediol, propylene glycol, or mixtures thereof in combination with a sufficient amount of edible acid to provide a pH of 4.0 to 6.8. Also included in the food is a foodstuff. An antimycotic may be added to the food if necessary. This procedure is also applicable to a pet food.

As depicted in the sole FIGURE of the Drawing the stabilizing mixture within a 35 percent to 65 percent moisture and a 2 percent to 19 percent range of propylene glycol, 1,3-butanediol, or mixture thereof, the food is stable at a certain pH. On the Y axis of the depicted graph, is the percent of moisture by weight of the food. On the X axis of the drawing figure depicting the graph is the percentage of propylene glycol or 1,3-butanediol by weight of the food. The maximum limit of percent moisture is set at 65 percent, because, above this range the product becomes too difficult to process and the texture becomes too moist, soft and sticky. The percentage of glycol is set at the maximum of 19 percent, because, above this range the food becomes too bitter in palatability to be acceptable to the consumer. As is clearly indicated by the sole Figure of the Drawing, when the food has the percentage of moisture and the percentage of glycol falling within the boundaries or area depicted, it is stable if the pH is adjusted.

In other words, the principles of plane geometry apply here. When it is stated that a pH of 4.0 to 4.5 will protect an area encompassed by ABCDEFGHIJ, it is meant that the whole area is included. For example, the pH of 4.0 to 4.5 will protect the moisture and polyhydric alcohol areas defined by ABJ, BCIJ, CDHI, DEGH, and EFG. The defined areas are contiguous and adjoining. By defining area ABCDEFGHIJ, is meant that all areas therein are included. In a similar fashion, for a pH of 4.5 to 5.0, the moisture and polyhydric alcohol contents within BCDEFGHIJ, are protected by a pH of 4.5 to 5.0. By this is meant that the area BCIJ is protected by 4.5 to 5.0, that the area CDHI is protected by the pH of 4.5 to 5.0, that the area DEGH, is protected by the pH of 4.5 to 5.0, and the area EFG, is protected by a pH of 4.5 to 5.0. What is not protected by 4.5 to 5.0 is the area defined by ABJ, wherein a pH of 4.0 to 4.5 is effective at the moisture and polyhydric alcohol contents defined therein. Thus, it may be seen that as the pH increases, the area protected decreases.

It follows that according to the sole FIGURE of the Drawing, for a pH of 5.0 to 5.5 the entire area CDEFGHI is protected. By this is meant that the area CDHI, is protected by a pH of 5.0 to 5.5, that the area DEGH is protected by a pH of 5.0 to 5.5, and that the area EFG is protected by a pH of 5.0 to 5.5. However, areas BCIJ, ABCIJ, and ABJ are not protected by a pH range of 5.0 to 5.5.

Likewise, at a pH range of 5.5 to 6.0, the areas DEFGH are protected. This area includes of course DEGH, and EFG. In a similar fashion, the area EFG is protected by a pH of 6.0 to 6.8. Likewise, a pH of 5.5 to 6.0 does not protect areas ABJ, ABCIJ, and ABCDHI.

As is evident from the above discussion, the area EFG is protected by all five pH ranges. The area DEGH is protected by four pH ranges, the pH range of 6.0 to 6.8 being excluded. Also, it is evident that the area CDHI is protected by three pH ranges (5.0 to 5.5, 4.5 to 5.0, and 4.0 to 4.5) but not pH ranges 5.5 to 6.0 and 6.0 to 6.8. In the same fashion, it thus becomes obvious that the area BCIJ is protected by two pH ranges (4.0 to 4.5 and 4.5 to 5.0). And area ABJ is protected by only one pH range (4.0 to 4.5). Thus, it is reemphasized that as the pH increases the area of protection at the defined moisture and polyhydric alcohol content set forth in the sole FIGURE of the Drawing decreases.

As can be noted by the above description, the lower pH range of 4.0 to 4.5 stabilizes the product anywhere under the curve depicted at any of the propylene glycol or 1,3-butanediol concentrations depicted. As the pH approaches neutrality the area of stability achieved at the particular pH becomes smaller. Accordingly, it is clearly pointed out that the sole FIGURE of the Drawing as presented defines the minimum amount of propylene glycol or 1,3-butanediol necessary for stability at a fixed pH of the product system. The sole FIGURE of the Drawing also points out that the amount of glycol required is a function of moisture content and pH. Additional amounts of propylene glycol or 1,3-butanediol above the minimum may be used to provide plasticizing or textural properties, so long as the maximum 19 percent is not exceeded. It is also important to realize that the area of microbiological stability defined by a pH of 4.0 to 4.5 stabilizes the whole area in terms of moisture and glycol concentration. For example a product having a pH of 4.0 to 4.5 is stable whether it contains the percent moisture and percent glycol concentrations outlined by the area designated by the sole FIGURE of the Drawing as having a pH of 6.0 to 6.8 or any other pH area designated by the drawing. The reverse is not true, because as moisture increases or propylene glycol or 1,3-butanediol, decreases, or both, more acid is required to provide stability.

As is clear from the sole FIGURE of the Drawing, the food stabilized generally has a moisture content of about 35 percent to about 65 percent. By moisture content is meant both the water added to the food as free water and the water inherently present in the components or ingredients of the food. More preferably, the food has a moisture content of about 35 percent to about 60 percent.

Also clear from the sole FIGURE of the Drawing is placing of the desired water activity at 0.91 to about 0.95. More preferably the water activity is about 0.92 to about 0.95.

A sufficient amount of at least one acidic compound is added to adjust the pH of the food to a range of 4.0 to 6.8. More preferably, the pH range is 4.0 to 6.0. To achieve these pH ranges, it is customary to use from a trace to about 5 percent of a food grade acidic compound such as an organic or inorganic acid or salt. Typical food grade organic acids include acetic, lactic, glucono delta lactone, adipic, succinic acids, and typical inorganic acids such as phosphoric, sulphuric, and hydrochloric acid or mixtures thereof can be used. Furthermore, the typical foodgrade acid salts may include monocalcium phosphate, monosodium phosphate, monopotassium phosphate, aluminum sulfate, sodium aluminum sulfate, sodium acid pyrophosphate, potassium acid tartrate, and mixtures thereof. Also, the salts and the acids can be mixed to achieve the desired pH.

By combining the acid, propylene glycol, 1,3-butanediol, and mixtures thereof in the prescribed ratio, stability is achieved for a food having a high water activity, while avoiding or minimizing the problem caused by each of these components alone in an excessively high amount. If desired an antimycotic can be used in an amount sufficient to help prevent mold. More preferably, if used the antimycotic is present in a trace amount up to about 1 percent by weight. Even more preferably, if the antimycotic is used, from a trace to about 0.5 percent may be used. Potassium sorbate or sorbic acid is the preferred antimycotic due to availability and effectiveness. Other suitable antimycotics include the benzoates, the parabens, the propionates, the acetates, or mixtures thereof.

The antimycotic is truly an optional ingredient. When added to the food product, the antimycotic insures microbiological stability. The antimycotic especially insures mold stability. The antimycotic is especially useful if the food product falls on near lines BJ, CI, DH, and EG and is at a higher pH permitted at those lines.

It is the unique combination of propylene glycol or 1,3-butanediol plus an appropriate acidic pH which provides the microbiological stability at the maximum moisture limits at each of the defined pH ranges given in the sole FIGURE of the Drawing.

Also, there is a mathematical means of expressing the stabilization of the product of this invention especially derived from a study of the sole FIGURE of the Drawing. First, the percent moisture is considered as being greater than or equal to 35 and less than or equal to 65 while at the same time considering the percent glycol content in the food as being greater than or equal to 2 and less than or equal to 19. Furthermore, if the symbol M is assigned to represent moisture and the symbol G is assigned to represent propylene glycol or 1,3-butanediol the following equations apply:

For a product pH of 6.0 to 6.8 the following equation applies:

$$(\% M) - 1.25(\% G) \leq 28.75 \qquad (1)$$

For a product pH of 5.5 to 6.0 then $$(\% M) - 1.875(\% G) \leq 28.75 \qquad (2)$$

For a product pH range of 5.0 to 5.5 then $(\% M) - 2.08(\% G) \leq 32.12$ (3)

For a product pH range of 4.5 to 5.0 then $(\% M) - 3.00(\% G) \leq 33.5$ (4)

Based on these equations, at a given pH either the maximum moisture content or the minimum propylene glycol (or 1,3-butanediol) can be determined that will give a stable product.

Also it is obvious that if both the moisture content and propylene glycol or 1,3-butanediol concentrations are known, then the maximum pH or highest pH required for a stable product can be determined.

The following problems illustrate the use of the above equations to determine either the minimum amount of propylene glycol or 1,3-butanediol necessary to stabilize the food system if both the pH and moisture content are given or to determine the maximum moisture content if the pH and propylene glycol or 1,3-butanediol are known.

1. If it is desirable to make a product having a pH of 6–6.8 and a % moisture content of 40%, it is possible to determine the minimum amount of propylene glycol necessary to stabilize this system by using equation #1 as follows:

If Equation #1 is $$(\% M) - 1.25(\% G) = 28.75;$$

by letting (% M) = 40, the results are $$40 - 1.25(\% G) = 28.75;$$

$$-1.25(\% G) = -11.25;$$

$$\% G = 9.0.$$

The minimum amount of propylene glycol which can be used to stabilize this pH product at 40% moisture is 9%. More propylene glycol or acid can be added to this system if desired.

2. If it is now desired to determine the minimum amount of propylene glycol for a product with the same % M content as in the preceding example but with a pH range of 4.5–5.0, equation #4 would then apply:

If Equation #4 is $$(\% M) - 3(\% G) = 33.5,$$

by letting % M = 40, the results are, $$40 - 3(\% \text{ G}) = 33.5$$

$$-3(\% \text{ G}) = -6.5$$

$$\% \text{ G} = 2.17$$

The minimum amount of propylene glycol which will stabilize this system is 2.17%. However again more propylene glycol or acid can be added if desired, as long as the 2 to 19 percent and pH 4.0 to 6.8 limits are not exceeded.

3. If it is desirable to make a product having a pH range of 4.5–5.0 using no more than 2% propylene glycol, it is possible by using equation #4 to determine the maximum amount of moisture this product can have and yet retain microbiological stability:

If Equation #4 is $$(\% \text{ M}) - 3.0(\% \text{ G}) = 33.5,$$

by letting % G=2, the results are $$\% \text{ M} - 6 = 33.5;$$

$$\% \text{ M} = 39.5.$$

Hence the maximum amount of moisture this product can retain and yet be stable is 39.5%.

This invention thus provides a unique way of preserving foods having these high moisture levels and water activities ($A_w$) exceeding 0.91 by using the combination of acid and either propylene glycol, 1,3-butanediol, or mixtures thereof. On a weight percent basis, propylene glycol and 1,3-butanediol are equivalent for the purposes of this invention. For example, 10 percent propylene glycol is equivalent on a weight percentage basis to a mixture of 5 percent propylene glycol and 5 percent 1,3-butanediol which is equivalent to 10 percent 1,3-butanediol on a weight percentage basis. This disclosure thus provides the means for those skilled in the art of predicting the microbiological stability of high moisture content products, both in view of the sole FIGURE of the Drawing and in view of the above discussed mathematical formula.

The clear requirements for the food of this invention are shelf stability within the desired water activity and moisture content ranges as provided by the stability system consisting essentially of (1) propylene glycol, 1,3-butanediol or mixtures thereof, (2) an acidic component and optionally an antimycotic. The other components are selected depending on the type of food desired to be formed. The stability system may be used with a chip-like snack food. It may also be used with a highly nutritious food. The stability system (or microbiologically stabilized mixture) may be used with any food or foodstuff having the desired moisture content and water activity.

By foodstuff is meant either all the various ingredients, or substances known in the art which give food its desired characteristics such as color, shape, texture, apppearance or nutrition.

When the foodstuff which is combined with this stability system is to form a maintenance or nutritious pet food, it must contain a sufficient amount of protein from either an animal source, a vegetable source, or mixtures thereof to provide the nutritional parameters as set forth by the National Research Council. If it is considered to be a snack food or a treat, then protein content is not a limiting factor. Also, other ingredients to provide a suitable texture, appearance or flavor may be included.

As indicated, the protein source for this product is either a vegetable protein source, an animal derived protein source, or a combination thereof. The critical point in choosing a protein source is that it must provide the nutritional and legal requirements for the protein in the product. For example, the protein content of a "maintenance" pet food must be at least about 15 percent to about 50 percent. By "maintenance" is meant provision of all necessary nutrition for an adult pet. Protein levels are critical depending on the type of pet being fed. A dog food protein content is advantageously about 15 percent to less than 30 percent by weight of the pet food on a dry basis while a maintenance type cat food protein content is advantageously about 30 percent or above by weight on a dry basis. These protein requirements are recommendations made by National Research Council for dogs and cats, respectively. No such firm recommendations for a human food exist at the present time.

By animal protein source is meant a meat, a meat by-product or mixtures thereof as defined in U.S. Pat. No. 3,380,832 to Bone incorporated herein by reference. The animal protein source may also be used alone or in combination with the vegetable protein source in the above percentage ranges, so long as the total required protein content as above defined is met. By meat is meant the flesh of cattle, swine, sheep, goats, horses, whale and other mammals, poultry, and fish. By meant by-products is meant those things shown in the 1976 Association of American Feed Control Officials, Inc. under No. 9, Animal Products, Section 9.3, Page 77, which defines meat by-products as the non-rendered clean wholesome part other than meat derived from slaughtered animals. Meat by-products include, but are not limited to lungs, spleen, kidneys, brain, livers, blood, partially defatted low temperature fatty tissue, stomachs and intestines freed of their contents. If it bears the name descriptive of its kind, it must correspond thereto (proposal 1973, adopted 1974 N.R.C. 5-00-395). Animal protein also includes such materials as animal liver meal, animal liver and glandular meal, extracted animal liver meal, whale meal, meat and bone meal, animal by-product meal, dried meat solubles, meat meal, fish meal, fish protein concentrate, poultry parts, poultry by-products, poultry by-product meal, and blood meal.

By "vegetable protein source" is meant those vegetable ingredients which normally contain 20 percent or more protein by weight. Example of vegetable protein sources are soybean oil meal, soybean flour, soy protein concentrate, soy protein isolates, cottonseed meal, cottonseed flour, cottonseed protein concentrates, cottonseed protein isolates, peanut meal, peanut flour, peanut protein concentrates, peanut protein isolates, corn germ, corn germ meal, wheat germ, wheat germ meal, corn gluten meal, corn gluten feed, corn distiller's dried grains, dried corn distiller's solubles and any other edible proteinaceous vegetable foodstuff taken singly or in mixtures thereof.

Generally speaking, any one of the above named meat, meat by-products or animal protein or vegetable protein products may be used in the food or pet food of this invention. Also mixtures of two or more of the meat, meat by-products or other animal protein sources may be used in this soft moist type food or pet food. Additionally, meat, meat by-products and other animal protein source mixture with vegetable protein are suitable for use in the product of this invention.

Another component suitable for making the product of this invention is an edible water absorbing hydrocolloid. By the use of that term, it is intended to mean a hydrocolloid which can absorb from at least 1 to 200 times its weight in water. This term includes amylaceous ingredients, polysaccharide gums, pectin, and other water absorbing colloids. Generally speaking, the edible water absorbing hydrocolloid is present in the product at about 1 to 30 percent by weight. More specifically, the edible water absorbing hydrocolloid is present in the food product at about 2 to 25 percent by weight. Such materials are adequately defined in U.S. Pat. No. 3,974,296 to Burkwall incorporated herein by reference. This ingredient contributes to the product by binding or absorbing free water, thereby preventing the product from becoming too sticky or sloppy in texture.

By "amylaceous ingredients" is meant those foodstuffs containing a preponderance of starch and/or starch-like material. Examples of amylaceous ingredients are cereal grains and meals or flours obtained upon grinding cereal grains such as corn, oats, wheat, milo, barley, rice, and the various milling by-products of these cereal grains such as wheat feed flour, wheat middlings, wheat shorts, wheat red dog, oat groats, hominy feed, and other such material. Also included as sources of amylaceous ingredients are the tuberous foodstuffs such as potatoes, tapioca, and the like. Other examples of amylaceous ingredients are the various edible grain or tuberous starches and modified cooked or otherwise treated starches such as those discussed in U.S. Pat. No. 4,006,266 to Bone and Shannon, incorporated herein by reference. Mixtures of these various starches may also be used. Also modified starches or flour may be used, for example, the use of pregelatinized wheat flour or polysaccharide starches may also be used as the water binder. The use of pregelatinized starches or flours are preferred because of their ability to absorb or bind water in the food matrix thereby assisting in the processing of the product.

Vitamins, minerals, colors, antioxidants, emulsifiers, sweeteners, flavors, fats, oils, and other known food additives may be used as well to enhance the pet food properties. Included in the vitamin and mineral supplements are ingredients such as choline chloride, magnesium oxide, vitamin A, $B_{12}$, $D_3$, and E, riboflavin, niacin, folic acid, pyridoxine hydrochloride, thiamine mononitrate, calcium pantothenate and other suitable vitamins and minerals. Other ingredients such as a sweetener, a sugar source and coloring can be added in a sufficient amount to give the desired appearance, texture, nutritional properties and enhance the palatability even more if desired.

The formulations of this invention may be processed in any suitable fashion. Processing temperatures to formulate the pet food range from 60°–120° C. and serve to cook the food. The cooked food thus made may have a meat-like appearance similar to the non-expanded meat portion described in U.S. Pat. No. 3,974,296 to Burkwall, incorporated herein by reference or be expanded similar to the expanded pet food disclosed in U.S. Pat. No. 4,011,345 to Bartsch, incorporated herein by reference. In this fashion, the formulations of this invention may be either expanded or non-expanded as desired.

Even though the concept of this invention can be readily understood from the above description by one having ordinary skill in the art, the following examples are presented to guarantee a complete understanding of the invention without limiting the invention. All parts and percentages recited herein and throughout the specification are by weight unless otherwise specified.

EXAMPLE 1

The following ingredients are assembled and formulated into a bacon flavored, rich protein, nutritious snack food suitable for human consumption by the method set forth in U.S. Pat. No. 3,974,296 to Burkwall.

|  | % by weight |
|---|---|
| Soy Protein Isolate | 25.0 |
| Wheat Flour | 4.0 |
| Bacon Flavoring, vitamins, minerals, and coloring | 1.0 |
| Water | 60.0 |
| Propylene Glycol | 9.0 |
| Phosphoric Acid | 1.0 |
|  | 100.0 |

After processing this snack type product has a moisture content of 55%, a water activity of 0.95 and a pH 5.0 and is microbiologically stable.

EXAMPLE 2

The following ingredients are assembled and formulated into a meat-like pet food by the method set forth in U.S. Pat. No. 3,974,296, to Burkwall.

|  | % |
|---|---|
| Beef Tripe | 28.0 |
| Corn Syrup | 8.5 |
| Soy Flour | 15.0 |
| Soy Grits | 19.0 |
| Propylene Glycol | 5.0 |
| Wheat Feed Flour | 8.0 |
| Animal Fat | 2.7 |
| Salts, Vitamins, Minerals Color | 2.1 |
| Potassium Sorbate | 0.2 |
| Sodium carboxy methyl cellulose gum | 0.3 |
| Phosphoric Acid | 0.7 |
| Water | 10.5 |
|  | 100.0 |

This product has a moisture content of 37 percent, a pH of 6.0 and a water activity $A_w$ of 0.91 (microcrystalline cellulose technique), and is microbiologically stable.

EXAMPLE 3

The procedure of Example 1 is repeated using the following ingredients:

|  | % |
|---|---|
| Beef Lungs | 28.0 |
| Corn Syrup | 8.5 |
| Soy Flour | 14.8 |
| Soy Grits | 18.5 |
| 1,3-Butanediol | 5.0 |
| Wheat Feed Flour | 7.6 |
| Animal Fat | 2.5 |
| Salts, Vitamins, Minerals, Color, etc. | 2.0 |
| Potassium Sorbate | 0.1 |
| Phosphoric Acid | 1.0 |
| Water | 12.0 |
|  | 100.0 |

This product has a moisture content of 37 percent, a pH of 5.7 and a water activity of 0.91 and is microbiologically stable.

EXAMPLE 4

The procedure of Example 1 is repeated using the following ingredients:

|  | % |
|---|---|
| Pork Liver | 26.0 |
| Corn Syrup | 8.0 |
| Soy Flour | 14.0 |
| Soy Grits | 17.5 |
| 1,3-Butanediol | 7.0 |
| Wheat Feed Flour | 6.0 |
| Animal Fat | 2.4 |
| Salt, Vitamins, Minerals, Color | 1.7 |
| Potassium Sorbate | 0.1 |
| Phosphoric Acid | 0.5 |
| Guar Gum | .3 |
| Water | 16.5 |
|  | 100.0 |

This product has a moisture content of 38 percent, a pH of 6.5 and water activity of .91, and is microbiologically stable.

EXAMPLE 5

The procedure of Example 1 is repeated using the following ingredients:

|  | % |
|---|---|
| Beef Tripe | 24.0 |
| Soy Protein Concentrate | 3.0 |
| Soy Isolate | 16.0 |
| 1,3 Butanediol | 11.0 |
| Pregelantinized wheat flour | 4.3 |
| Animal Fat | 2.0 |
| Salt, Vitamins, Minerals, Color | 2.8 |
| Phosphoric Acid | 1.7 |
| Potassium Sorbate | 0.2 |
| Water | 35.0 |
|  | 100.0 |

This product has a moisture content of 56.7 percent, a pH of 4.8 and a water activity of 0.94 and is microbiologically stable.

EXAMPLE 6

The procedure of Example 1 is repeated using the following ingredients:

|  | % |
|---|---|
| Beef Tripe | 24.0 |
| Soy Protein Concentrate | 3.0 |
| Soy Isolate | 16.0 |
| Propylene Glycol | 3.0 |
| 1,3-Butanediol | 8.0 |
| Pregelatinized Oat Flour | 4.3 |
| Animal Fat | 2.0 |
| Salt, Vitamins, Minerals, Color | 2.8 |
| Phosphoric Acid | 1.7 |
| Potassium Sorbate | 0.2 |
| Water | 35.0 |
|  | 100.0 |

This product has a moisture content of 56.7 percent, a pH of 4.8 and a water activity of 0.94 and is microbiologically stable.

EXAMPLE 7

The procedure of Example 1 is repeated using the following ingredients:

|  | % |
|---|---|
| Beef Tripe | 27.0 |
| Soy Protein Concentrate | 3.0 |
| Soy Protein Isolate | 16.0 |
| Pregelatinized Wheat Flour | 4.5 |
| 1,3-Butanediol | 5.0 |
| Wheat Feed Flour | 6.0 |
| Animal Fat | 2.0 |
| Salt, Vitamins, Minerals, Color | 2.3 |
| Potassium Sorbate | 0.2 |
| Phosphoric Acid | 1.8 |
| Water | 32.2 |
|  | 100.0 |

This product has a moisture content of 46 percent, a pH of 4.4, and water activity of 0.970 (microcrystalline cellulose method), and is microbiologically unstable due to a high water activity outside the range of this invention.

EXAMPLE 8

The procedure of Example 1 is repeated using the following ingredients:

|  | % |
|---|---|
| Beef Tripe | 27.0 |
| Soy Protein Concentrate | 3.0 |
| Soy Protein Isolate | 16.0 |
| Pregelatinized Wheat Flour | 4.5 |
| 1,3-Butanediol | 7.0 |
| Wheat Feed Flour | 4.0 |
| Animal Fat | 2.0 |
| Salt, Vitamins, Minerals, Color | 2.0 |
| Potassium Sorbate | 0.2 |
| Phosphoric Acid | 1.8 |
| Water | 32.5 |
|  | 100.0 |

This product has a moisture content of 57 percent, a pH of 4.3, and water activity of 0.960 (microcrystalline cellulose method), and is microbiologically unstable due to high water activity outside of the range of this invention. Thus, even though the pH and moisture content are within the limits given, the product is unstable because of the water activity being outside the stated limits.

EXAMPLE 9

The procedure of Example 1 is repeated using the following ingredients:

|   | % |
|---|---|
| Tripe | 23.0 |
| Soy Grits | 17.0 |
| Special X Soy Flour | 14.0 |
| Wheat Feed Flour | 8.4 |
| Corn Syrup | 8.0 |
| 1,3-Butanediol | 3.0 |
| Potassium Sorbate | 0.2 |
| Phosphoric Acid | 1.3 |
| Animal Fat | 2.0 |
| Salt, Vitamins, Minerals, Color | 2.3 |
| Water | 20.8 |
|   | 100.0 |

This product has a moisture content of 40 percent, a pH of 5.8, a water activity of 0.94 and is microbiologically unstable due to 3 percent 1,3 butanediol being outside the range to provide stability as specified for a product with a pH of 5.8.

EXAMPLE 10

The procedure of Example 1 is repeated for the following three formulations. Formulation A contains potassium sorbate (an antimycotic), Formulation B contains no potassium sorbate, and Formulation C contains an additional 2 percent propylene glycol to replace the antimycotic function.

|   | A | B | C |
|---|---|---|---|
| Meat and Meat By-Products | 28.0 | 28.0 | 28.0 |
| Soy Grits | 20.0 | 20.0 | 20.0 |
| Soy Flour | 16.0 | 16.0 | 16.0 |
| Corn Syrup | 9.0 | 9.0 | 9.0 |
| Propylene Glycol | 5.5 | 5.5 | 7.5 |
| Potassium Sorbate | 0.1 | — | — |
| Wheat Flour | 4.0 | 4.1 | 2.1 |
| Animal Fat | 1.7 | 1.7 | 1.7 |
| Color, Vitamins, Minerals, Salts | 5.4 | 5.4 | 5.4 |
| Water | 10.0 | 10.0 | 10.0 |
| Phosphoric Acid | 0.3 | 0.3 | 0.3 |
|   | 100.0 | 100.0 | 100.0 |

Both Formulation A, B, and C have a moisture content of 35 percent, a pH of 6.5 and a water activity of 0.91. Product A and C are microbiologically stable, but Product B is microbiologically unstable. This shows that an antimycotic in combination with an acidic pH and propylene glycol is required to provide the necessary stability. Also it shows that the 0.1 percent sorbate can be effectively replaced by 2.0 percent propylene glycol, 1,3-butanediol can be partially or completely substituted for propylene glycol in Formulation A, above, with equivalent results.

EXAMPLE 11

The following ingredients are assembled and formulated into a semi-moist pet food in a standard fashion.

|   | % |
|---|---|
| Beef Tripe | 28.0 |
| Corn Syrup | 9.0 |
| Soy Flour | 15.0 |
| Soy Grits | 19.0 |
| Propylene Glycol | 7.0 |
| Wheat Feed Flour | 7.0 |
| Animal Fat | 2.0 |
| Salts, Vitamins, Minerals, |  |

-continued

|   | % |
|---|---|
| Color | 2.2 |
| Phosphoric Acid | 1.75 |
| Water | 9.05 |
|   | 100.0 |

This product has a moisture content of 36 percent, a pH of 5.0, and $A_w$ of 0.95 (microcrystalline cellulose determination) and it is stable against mold growth even without antimycotic.

EXAMPLE 12

The following ingredients are assembled and formulated into a semi-moist pet food in a standard fashion.

|   | % |
|---|---|
| Meat and Meat By-Products | 26.0 |
| Corn Syrup | 9.0 |
| Soy Flour | 15.0 |
| Soy Grits | 19.0 |
| Propylene Glycol | 3.0 |
| Wheat Feed Flour | 11.5 |
| Animal Fat | 2.0 |
| Salts, Vitamins, Minerals, Color | 2.2 |
| Phosphoric Acid | 1.75 |
| Water | 10.55 |
|   | 100.0 |

This product has a moisture content of 36 percent, a pH of 5.5, and an approximate $A_w$ of 0.95 and it molds due to an insufficient amount of propylene glycol.

EXAMPLE 13

The following ingredients are assembled and formulated into a cheese flavored, high protein snack suitable for human consumption using the procedure of Example 1.

|   | % |
|---|---|
| Soy Protein Isolate | 20.0 |
| 1,3-Butanediol | 15.0 |
| Wheat Flour | 14.0 |
| Cheese Flavor | 0.7 |
| Phosphoric Acid | 0.3 |
| Water | 50.0 |
|   | 100.0 |

After processing, this product has a moisture content of 42.0, a pH of 6.0 and a water activity of 0.95, and is microbiologically stable.

Obviously, modifications of this invention are possible. It is understood, therefore, that this application is intended to cover any variations, uses, or adaptations of the invention as may be considered to be known or customary practice in the art to which this invention pertains.

Having fully described and disclosed the invention, what is claimed and desired to be secured by Letters Patent of the United States is:

1. In a process of stabilizing a food against microbiological decomposition wherein the food comprises foodstuff and a stabilizing mixture, the improvement comprising:

(a.) forming a foodstuff having a moisture content of from 51 to 65 percent by weight moisture, and a water activity of 0.91 to 0.95;
(b.) admixing:
  I. a stabilizing mixture consisting essentially of a sufficient amount of an acidic compound selected from the group consisting of acid, acid salt, and mixtures thereof to lower the pH to 4.0 to 6.8, and 2 to 19 percent polyhydric alcohol being at least one selected from the group consisting of propylene glycol and 1,3-butanediol; the amounts of acidic compound and polyhydric alcohol being selected according to the sole FIGURE of the Drawing; and
  II. the foodstuff to form an admixture;
(c.) cooking and shaping said admixture at a temperature of 60° to 120° C. to form a stabilized food.

2. The process of claim 1 wherein the cooking and shaping is done by extrusion.

3. The process of claim 2 in which the pH is 4.0 to 4.5 and the amount of polyhydric alcohol and moisture content is defined by the area of ABCDEFGHIJ of the FIGURE.

4. The process of claim 3 in which the pH is 4.0 to 4.5 and the amount of polyhydric alcohol and moisture content is defined by the area of ABJ of the FIGURE.

5. The process of claim 2 in which the pH is 4.5 to 5.0 and the amount of polyhydric alcohol and moisture content is defined by the area of BCDEFGHIJ of the FIGURE.

6. The process of claim 5 in which the pH is 4.5 to 5.0 and the amount of polyhydric alcohol and moisture content is defined by the area of BCIJ of the FIGURE.

7. The process of claim 2 in which the pH is 5.0 to 5.5 and the amount of polyhdric alcohol and moisture content is defined by the area of CDEFGHI of the FIGURE.

8. The process of claim 7 in which the pH is 5.0 to 5.5 and the amount of polyhydric alcohol and moisture content is defined by the area of CDHI of the FIGURE.

9. The process of claim 2 in which the pH is 5.5 to 6.0 and the amount of polyhydric alcohol and moisture content is defined by the area of DEFGH of the FIGURE.

10. The process of claim 9 in which the pH is 5.5 to 6.0 and the amount of polyhydric alcohol and moisture content is defined by the area of DEGH of the FIGURE.

11. The process of claim 2 in which the pH is 6.0 to 6.8 and the amount of polyhydric alcohol and moisture content is defined by the area of EFG of the FIGURE.

12. The process of claim 2 in which the pH is 4.0 to 6.8 and the amount of polyhydric alcohol and moisture content is defined by the area of ABCDEFGHIJ of the FIGURE.

13. The process of claim 12 in which the pH is 4.0 to 4.5 and the amount of polyhydric alcohol and moisture content is defined by the area of ABCDEFGHIJ of the FIGURE.

14. The process of claim 12 in which the pH is 4.0 to 4.5 and the amount of polyhydric alcohol and moisture content is defined by the area of BCDEFGHI of the FIGURE.

15. The process of claim 12 in which the pH is 4.5 to 5.0 and the amount of polyhydric alcohol and moisture content is defined by the area of BCDEFGHI of the FIGURE.

16. The process of claim 12 in which the pH is 5.0 to 5.5 and the amount of polyhydric alcohol and moisture content is defined by the area of CDEFGHI of the FIGURE.

17. The process of claim 12 in which the pH is 5.5 to 6.0 and the amount of polyhydric alcohol and moisture content is defined by the area of DEFGH of the FIGURE.

18. The process of claim 2 in which the polyhydric alcohol is propylene glycol.

19. In a process of stabilizing a food against microbiological decomposition, the improvement comprising:
(a.) adjusting the water activity of the food to from 0.91 to about 0.95;
(b.) adjusting the moisture content of the food to 51 percent to about 65 percent;
(c.) admixing the food with a stabilizing composition comprising about 2 percent to about 19 percent of at least one polyhydric alcohol and at least one acid, acid salt or mixtures thereof;
(d.) determining the maximum amount of moisture, or minimum amount of polyhydric alcohol component by assigning a value to the amount of moisture (%M) or to the amount of polyhydric alcohol (%G) thereby leaving a value unassinged;
(e.) solving an equation for the unassigned value wherein the equation is selected from the group consisting of:
(1) for a product pH of 6.0 to 6.8:

$$(\%M) - 1.25(\%G) \leq 28.75;$$

(2) for a product pH of 5.5 to 6.8:

$$(\%M) - 1.975(\%G) \leq 28.75;$$

(3) for a product pH range of 5.0 to 5.5:

$$(\%M) - 2.08(\%G) \leq 32.12;$$

(4) for a product pH range of 4.5 to 5.0:

$$(\%M) - 3.00(\%G) \leq 33.5.$$

20. A microbiologically stabilized shelf-stable food product containing 51–65 percent by weight moisture and having a water activity of 0.91–0.95, comprising foodstuff and a microbiologically stabilizing mixture of a sufficient amount of acid, acid salt, or mixtures thereof to adjust the food to a pH of 4.0–6.8 and 2–19 percent by weight of the food of at least one polyhydric alcohol selected from the group consisting of propylene glycol and 1,3-butanediol wherein the moisture content, the pH and the polyhydric alcohol are selected according to the sole FIGURE of the drawing.

* * * * *